United States Patent
Thyagarajan et al.

(10) Patent No.: US 12,218,664 B2
(45) Date of Patent: *Feb. 4, 2025

(54) BACKSIDE POWER SUPPLY TECHNIQUES

(71) Applicant: Arm Limited, Cambridge (GB)

(72) Inventors: Sriram Thyagarajan, Austin, TX (US); Yew Keong Chong, Austin, TX (US); Andy Wangkun Chen, Austin, TX (US); Ayush Kulshrestha, New Delhi (IN); Sony, Noida (IN); Rajiv Kumar Sisodia, Bangalore (IN)

(73) Assignee: Arm Limited, Cambridge (GB)

( * ) Notice: Subject to any disclaimer, the term of this patent is extended or adjusted under 35 U.S.C. 154(b) by 932 days.

This patent is subject to a terminal disclaimer.

(21) Appl. No.: 17/076,549

(22) Filed: Oct. 21, 2020

(65) Prior Publication Data
US 2022/0123751 A1    Apr. 21, 2022

(51) Int. Cl.
| | | |
|---|---|---|
| *G11C 11/00* | (2006.01) | |
| *G11C 11/417* | (2006.01) | |
| *H03K 19/00* | (2006.01) | |
| *G06F 113/04* | (2020.01) | |

(52) U.S. Cl.
CPC ........ *H03K 19/0016* (2013.01); *G11C 11/417* (2013.01); *H03K 19/0013* (2013.01); *G06F 2113/04* (2020.01)

(58) Field of Classification Search
None
See application file for complete search history.

(56) References Cited

U.S. PATENT DOCUMENTS

| | | |
|---|---|---|
| 7,420,832 B1 | 9/2008 | Lukes et al. |
| 8,937,368 B2 | 1/2015 | Harada et al. |
| 9,559,040 B2 | 1/2017 | Batra et al. |
| 9,780,210 B1 | 10/2017 | Goktepeli et al. |
| 9,870,979 B2 | 1/2018 | Batra et al. |
| 10,950,546 B1 | 3/2021 | Doornbos |
| 11,200,961 B1 | 12/2021 | Uribe |
| 2011/0095367 A1 | 4/2011 | Su et al. |
| 2014/0342529 A1 | 11/2014 | Goktepeli et al. |
| 2015/0121052 A1 | 4/2015 | Emma et al. |
| 2016/0140276 A1 | 5/2016 | Sarhan et al. |
| 2017/0336845 A1* | 11/2017 | Raj ................. G06F 30/394 |
| 2017/0373026 A1 | 12/2017 | Goktepeli |
| 2019/0097592 A1 | 3/2019 | Goktepeli |
| 2019/0296704 A1 | 9/2019 | Iwamoto |
| 2021/0111105 A1 | 4/2021 | Kim et al. |
| 2021/0225830 A1 | 7/2021 | Liu |
| 2022/0084561 A1* | 3/2022 | Chen ..................... G11C 8/08 |
| 2022/0262791 A1 | 8/2022 | Shi et al. |
| 2022/0328399 A1 | 10/2022 | Preston et al. |

* cited by examiner

*Primary Examiner* — Paul B Yanchus, III
(74) *Attorney, Agent, or Firm* — Pramudji Law Group PLLC; Ari Pramudji

(57) ABSTRACT

Various implementations described herein are related to a device having logic that operates in multiple voltage domains. The device may include a backside power network with rows of segmented supply rails coupled to the logic. The rows of segmented supply rails may include alternating rail breaks that define an interchanging directional supply of power to the logic in the multiple voltage domains.

20 Claims, 5 Drawing Sheets

400

410 — fabricate logic that operates in multiple voltage domains

420 — fabricate a backside power network with rows of segmented supply rails coupled to the logic 430 — provide the rows of segmented supply rails with alternating rail breaks that define an interchanging directional supply of power to the logic in the multiple voltage domains

FIG. 4

BACKSIDE POWER SUPPLY TECHNIQUES

BACKGROUND

This section is intended to provide information relevant to understanding the various technologies described herein. As the section's title implies, this is a discussion of related art that should in no way imply that it is prior art. Generally, the related art may or may not be considered prior art. It should therefore be understood that any statement in this section should be read in this light, and not as any admission of prior art.

In some memory architecture designs, conventional power rails can be buried in memory, wherein metal power lines can be buried in the substrate, and these lines can be used as power rails for voltage distribution from backside circuitry. However, in these conventional memory designs, memory cells typically use frontside power rails for voltage distribution to frontside circuitry including the memory cells. Unfortunately, conventional memory designs are inefficient in that use of frontside power rails for memory cells suffers from area penalty in fabrication. Therefore, there exists a need to improve conventional memory designs to improve area efficiency of modern memory architecture.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

FIG. 4 illustrates a diagram of a method for backside power distribution with buried power rails in accordance with implementations described herein.

DETAILED DESCRIPTION

Figure 1:
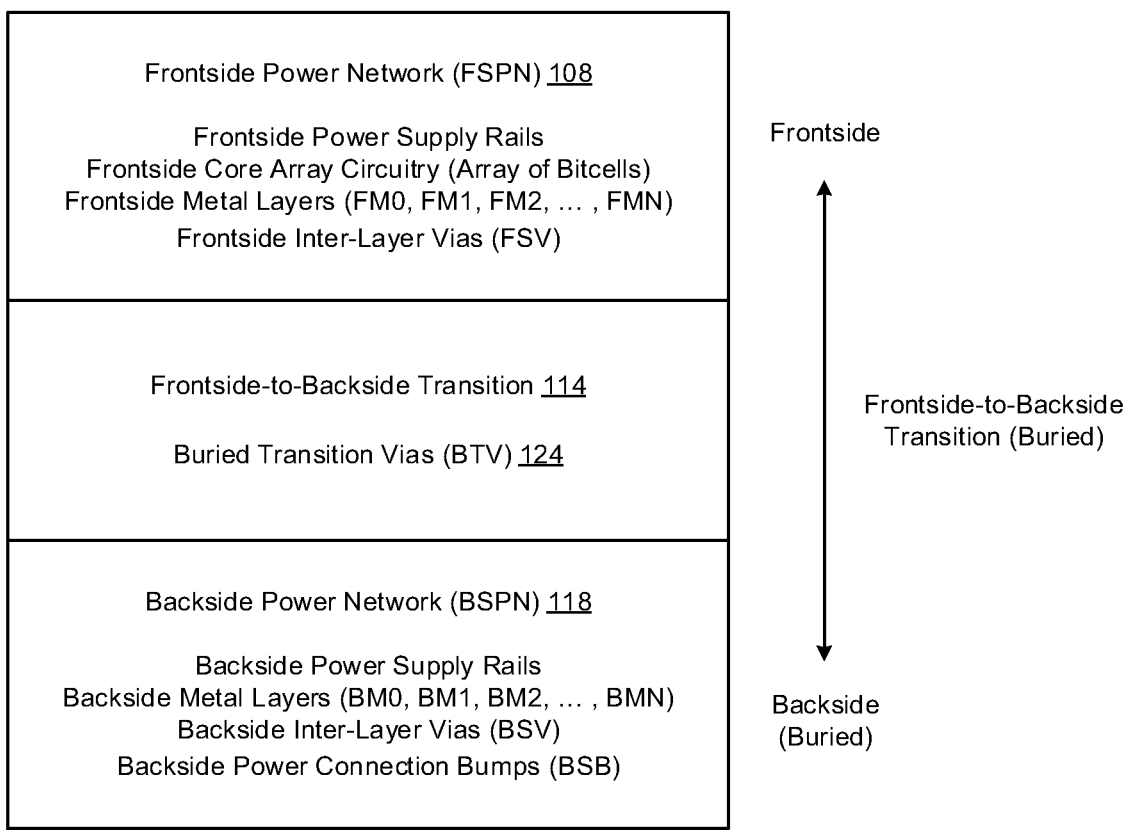
FIG. 1 illustrates a schematic diagram of buried power rail (BPR) architecture in accordance with various implementations described herein.

Various implementations described herein are directed to memory architecture having a power distribution network (PDN) with buried power supply rails in physical layout design. The various schemes and techniques described herein provide for a powergate cell architecture having buried metal for memory applications. In some implementations, rows of segmented supply rails have alternating rail breaks that define an interchanging directional supply of power to the logic in multiple different voltage domains. Therefore, in some configurations, the novel powergate cell architecture described herein may utilize buried backside metal for efficient backside power distribution in memory applications, and the powergate cell may be distributed within a smaller cell boundary so as to reduce area impact and also to improve the timing and performance of memory.

In some implementations, the power-gating schemes and techniques described herein may be used for reducing leakage in memories, wherein memory logic may be kept coupled to internal power supplies (VDDP/VDDC). For instance, in various scenarios, the internal power supply may be connected to external power supply (SOC supply) through a power-gating (PG) cell (e.g., PMOS/PFET device), and these PG cells are placed across different locations in memory to ensure a best possible supply to critical signals. With the introduction of buried metal and buried transition vias, traditional PG cell design has some limitations. As such, the power-gating schemes and techniques described herein provide for novel power-gating cell architecture in various memory applications so as to thereby enable efficient backside power by reducing the number of power gaps and by maximizing the power-gating transistor size within the same area. Further, the power-gating schemes and techniques described herein provide modular and flexible designs in a physical layout for different power-gating sizing without having to design a new layout cell.

In some implementations, the various backside power distribution schemes and techniques described herein may provide for random access memory (RAM) applications including static RAM (SRAM). Therefore, various implementations described herein may provide for a novel cell architecture that utilizes buried metal for critical signals in SRAM applications. In reference to backside power domains for SRAM technology, metallization may be provided frontside (e.g., above a device) and also backside (e.g., below a device) as buried power rails. In the logic domain, the buried power rails may be used to supply power to memory components in a core array such that power domains are used to avoid area penalty. Various implementations described herein may also provide for an overall power domain scheme for memory applications, including, e.g., various use of backside-to-frontside transition cells having transition vias. These aspects along with various other features and characteristics are described in greater detail herein.

Various implementations of memory architecture with a novel power distribution network (PDN) along with various power distribution schemes and techniques associated therewith will be described in greater detail herein with reference to FIGS. 1-4.

FIG. 1 illustrates a diagram 100 of buried power rail (BPR) architecture 104 in accordance with various implementations described herein.

In various implementations, the BPR architecture 104 may be implemented as a system or a device having various integrated circuit (IC) components that are arranged and coupled together as an assemblage or combination of parts that provide for a physical circuit design and related structures. In some instances, a method of designing, providing and building the BPR architecture 104 as an integrated system or device may involve use of various IC circuit components described herein to thereby implement various backside power distribution schemes and techniques associated therewith. The BPR architecture 104 may be integrated with computing circuitry and related components on a single chip, and the BPR architecture 104 may also be implemented in some embedded systems for automotive, electronic, mobile, server and Internet-of-things (IoT) applications.

As shown in FIG. 1, the BPR architecture 104 may include a frontside power network (FSPN) 108 having frontside power supply rails coupled to various components and/or logic circuits. In some instances, the frontside power supply rails may be coupled to logic circuitry associated with an array of bitcells that are arranged in columns and rows along with header logic and control logic. Also, the frontside power network (FSPN) 108 may include a number (N) of frontside metal layers (e.g., FSM0, FSM1, FSM2, ..., FSMN) along with frontside inter-layer vias (FSV).

The BPR architecture 104 may include a backside power network (BSPN) 118 that provides power distribution for memory components, logic and/or circuitry, such as, e.g., an array of bitcells, column multiplexer circuitry (COLMUX), sense amplifier circuitry (SA), powergate input/output (PG I/O) circuitry, and powergate control (PG_CNTL). The backside power network (BSPN) 118 may be configured to provide power in one or more voltage domains for control logic disposed frontside. The power distribution network may be configured to supply core voltages, periphery voltages and/or ground.

In some implementations, the backside power network (BSPN) 118 may include backside power rails that are formed with backside metals layers (e.g., BM0). In various instances, one or more backside power rails may be used to supply power, voltage and/or critical signals to memory circuitry, including, e.g., logic disposed frontside. The backside power network (BSPN) 118 may have various backside metal layers (e.g., BM0, BM1, BM2, ..., BMN) along with backside inter-layer vias (BSV). The backside power network (BSPN) 118 may include backside power connection bumps (BSB).

The BPR architecture 104 may include a frontside-to-backside transition 114 having buried transition vias (BTV) that are used for coupling the buried backside power network (BSPN) to the frontside power network (FSPN). The buried transition vias (BTV) 124 may be configured to provide a power transition between the backside power network (BSPN) 118 to the frontside power network (FSPN) 108. Thus, in some implementations, the BPR architecture 104 may be configured to transition the backside power rails of the backside power network to the frontside power rails of the frontside power network so as to thereby provide power taps to the memory circuitry from the backside power network (BSPN). In various instances, the buried transition vias may be used to transition critical signal nets from backside power rails to memory circuitry, including, e.g., logic disposed frontside. The frontside-to-backside transition 114 may be referred to as buried transition architecture that may have backside-to-frontside transition cells with the buried transition vias 124 that provide a coupling transition between the backside power network (BSPN) 118 and the frontside power network (FSPN) 108.

In some implementations, the backside power rail (BPR) architecture 104 may be configured to operate as power distribution network architecture that uses backside buried metal in the backside power network for the backside power rails and also uses frontside metal of the frontside power network for the frontside power rails. The frontside power network (FSPN) utilizes frontside metal, and the backside power network (BSPN) utilizes backside buried metal disposed underneath the frontside metal of the frontside power network (FSPN). Also, the transition architecture may refer to buried transition vias disposed between the backside buried metal of the backside power network (BSPN) and the frontside metal of the frontside power network (FSPN).

In various implementations, the buried power rail (BPR) architecture 104 may refer to a novel cell architecture that provides buried metal for critical signal nets in some memory applications, such as, e.g., random access memory (RAM) including static RAM (SRAM). For instance, the novel cell architecture is configured to provide backside power distribution for memory circuitry (e.g., SRAM), wherein metallization is provided frontside above the memory circuitry and also backside below the memory circuitry as buried power rails. The novel cell architecture also utilizes buried metallization for backside-to-frontside transition cells that allows for backside distribution of power and critical signal nets to the memory circuitry disposed frontside. The backside power rails for memory may be buried in the substrate and related oxide layers, and these buried metal lines may be utilized as power rails for distributing power and/or signal lines for transmitting critical signals. These aspects and various other features, behaviors and characteristics related to power-gating cell architecture are described herein in reference to FIGS. 2A-2B, 3 and 4.

Figure 2A:
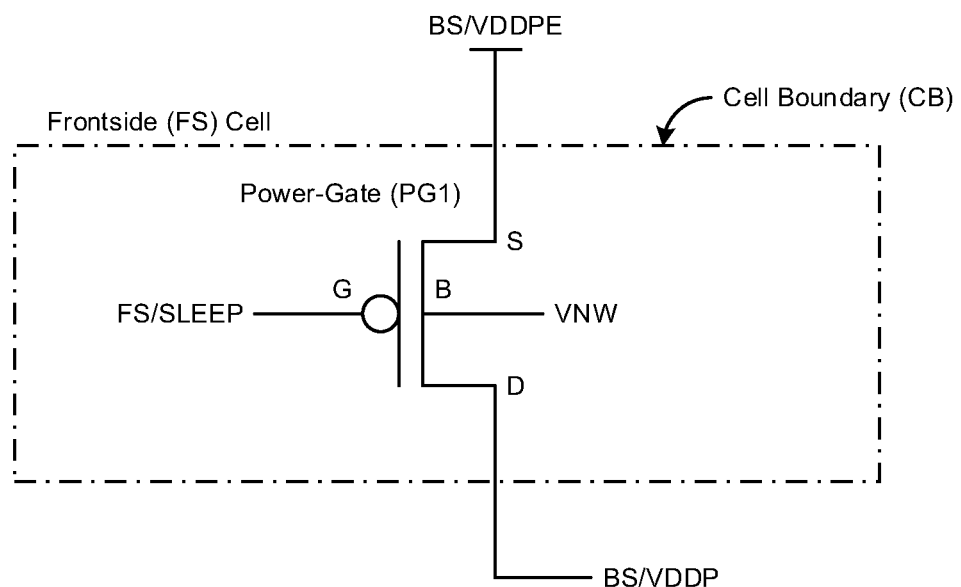
FIGS. 2A-2B illustrate various diagrams of powergate cell architecture utilizing buried power rails in accordance with various implementations described herein.
Figure 2B:
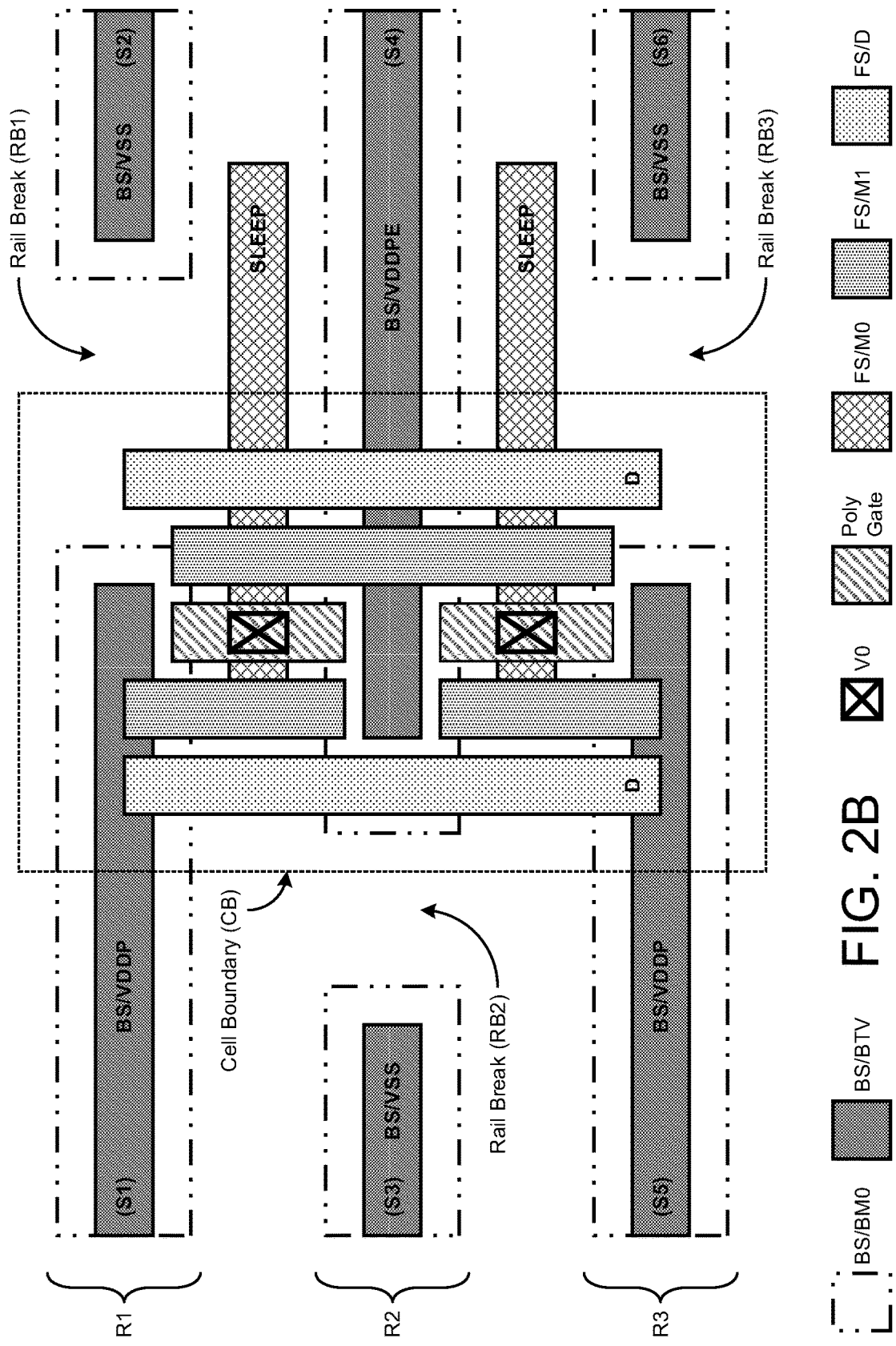

FIGS. 2A-2B illustrate various diagrams of powergate cell architecture utilizing buried power rails in accordance with implementations described herein. In particular, FIG. 2A shows a diagram 200A of powergate cell architecture 204A that utilizes buried power rails (BS/VDDPE, BS/VDDP), and FIG. 2B shows a diagram 200B of powergate cell architecture 204B that utilizes buried power rails (BS/VDDPE, BS/VDDP).

As shown in FIG. 2A, the powergate cell architecture 204A may include logic (e.g., powergate logic) that operates in multiple voltage domains (e.g., VDDPE, VDDP) and that utilizes backside (BS) buried power rails (BPR). The powergate cell architecture 204A may have a backside power network (BSPN) with rows of segmented power supply rails coupled to the logic (PG1). In various implementations, the rows of segmented power supply rails have alternating rail breaks that define an interchanging directional supply of power to the logic in the multiple voltage domains, as shown in FIG. 2B.

In some configurations, the powergate (PG) cell architecture 204A may include a power-gate transistor (PG1) that is disposed frontside (FS) within a cell boundary (CB) of a powergate cell. In this instance, the logic refers to powergate logic that operates with one or more transistors (e.g., PG1) having a source (S), drain (D) and gate (G) along with base (B) terminal. As shown in FIG. 2A, the source (S) of the transistor (PG1) may be coupled to a first backside power domain (BS/VDDPE), and the drain (D) of the transistor (PG1) may be coupled to a second backside power domain (BS/VDDP). The gate (G) of the transistor (PG1) may be coupled to a frontside control signal (FS/SLEEP), and also, the base (B) terminal of the transistor (PG1) may be coupled to an N-well (VNW) formed in the substrate. The transistor (PG1) may be implemented with a P-type MOS (PMOS) device; however, an N-type MOS (NMOS) may be used in other configurations.

In various implementations, the backside (BS) buried power rails (BPR) may be used as power supply connections for the powergate transistor (PG1), and therefore, the backside (BS) buried power rails (BPR) may be coupled to the source and drain terminals of the powergate transistor (PG1), as shown in FIG. 2A. In some instances, the multiple voltage domains refer to an external periphery voltage domain (VDDPE) and/or an internal periphery voltage domain (VDDP). In other instances, the multiple voltage domains may refer to an external core voltage domain (VDDCE) and/or an internal core voltage domain (VDDC). However, various other voltage configurations may be used.

As shown in FIG. 2B, the powergate cell architecture 204B may include logic within cell boundary (CB) that operates in multiple voltage domains (e.g., VDDPE, VDDP), and a backside power network (BSPN) with rows (e.g., R1, R2, R3) of segmented supply rails (e.g., S1/S2, S3/S4, S5/S6) coupled to the logic. In some implementations, the rows (R1, R2, R3) of segmented supply rails (S1/S2, S3/S4, S5/S6) have alternating rail breaks (e.g., RB1, RB2, RB3) that define an interchanging directional supply of power to the logic in the multiple voltage domains (VDDPE, VDDP). Also, the logic refers to powergate logic that operates with one or more transistors having a source, a drain and a gate.

The segmented supply rails (S1/S2, S3/S4, S5/S6) refer to buried power rails (BPR) that are separated and detached into multiple segments with the rail breaks (RB1, RB2, RB3), and also, the segmented supply rails (S1/S2, S3/S4, S5/S6) may be formed with buried backside metal (e.g., BS/BM0, BTV). In some scenarios, the multiple voltage domains refer to an internal periphery voltage domain (VDDP) and an external periphery voltage domain (VDDPE). However, in other scenarios, the multiple voltage domains may also refer to an internal core voltage domain (VDDC) and an external core voltage domain (VDDCE). Therefore, depending on a specific application, various configurations may be used to implement multiple different voltage domains provided backside (BS).

In some implementations, the alternating rail breaks (RB1, RB2, RB3) may refer to and characterize an alternating positional orientation of the rail breaks (RB1, RB2, RB3) so as to interchangeably provide multiple directional power supplies (VDDPE, VDDP) to the logic in the multiple voltage domains (VDDPE, VDDP). Also, the alternating rail breaks (RB1, RB2, RB3) may be disposed in a manner so as to successively alternate positions on either side of the logic from side-to-side. In various scenarios, successively alternating the positional orientation of the rail breaks (RB1, RB2, RB3) may allow for transposing the directional supply of power from row-to-row (R1, R2, R3) and from side-to-side along the length of the logic. For instance, in reference to the cell boundary (CB), a first row (R1) has a first rail break (RB1) disposed proximate to a first side (e.g., right-side) of the logic, and a second row (R2) has a second rail break (RB2) disposed proximate to a second side (e.g., left-side) of the logic. Also, a third row (R3) has a third rail break (RB3) disposed proximate to the first side (e.g., right-side) of the logic.

In some implementations, the rows (R1, R2, R3) of the segmented supply rails (S1/S2, S3/S4, S5/S6) may include the first row (R1), the second row (R2), and the third row (R3). The first row (R1) may have a first segmented supply rail (S1/S2) with multiple segments separated by the first rail break (RB1) that is disposed adjacent to the first side (e.g., right-side) of the logic. The second row (R2) may have a second segmented supply rail (S3/S4) with multiple segments separated by the second rail break (RB2) that is disposed on the second side (e.g., left-side) of the logic, which is opposite to the first side (e.g., right-side). Also, the third row (R3) may have a third segmented supply rail (S5/S6) with multiple segments separated by the third rail break (RB3) that is disposed on the first side (e.g., right-side) of the logic.

In some implementations, the multiple segments of the first segmented supply rail (S1/S2) may include a first segment (S1) that is configured to supply a first voltage domain (e.g., VDDP) and a second segment (S2) that is coupled to ground (VSS). Also, the multiple segments of the second segmented supply rail (S3/S4) may include a third segment (S3) that is coupled to ground (VSS) and a fourth segment (S4) that is configured to supply a second voltage domain (e.g., VDDPE) that is different than the first voltage domain (VDDP). Also, the multiple segments of the third segmented supply rail (S5/S6) may include a fifth segment (S5) that is configured to supply the first voltage domain (e.g., VDDP) and a sixth segment (S6) that is coupled to ground (VSS).

In some implementations, the powergate cell architecture 204B may include the frontside (FS) power rails (e.g., FS/M0, FS/M1, FS/D) along with poly gates. For instance, with the cell boundary (CB), the frontside (FS) power rails may include a first FS power rail (FS/M0), a second FS power rail, and a FS dummy rail (FS/D). In some instance, the first FS power rail (FS/M0) may be coupled to the poly gates by way of FS vias (V0), and a control signal (SLEEP) may be provided to the logic with a critical signal path. Also, the frontside (FS) power rails may be formed with frontside metals (FSM).

In some implementations, the powergate cell architecture 204B may include the backside (BS) power rails (e.g., BS/BM0, BTV), which may be used to provide and supply power to the logic. In some instances, the backside (BS) power rails may include a first BS power rail (BM0) that is configured to provide and supply the various different backside power domains (e.g., BS/VDDPE, BS/VDDP) from the backside (BS). Also, the BS power rails may have buried transition vias (BTV) that may be used to couple the first BS power rail (BM0) to the logic within the cell boundary (CB).

Figure 3:
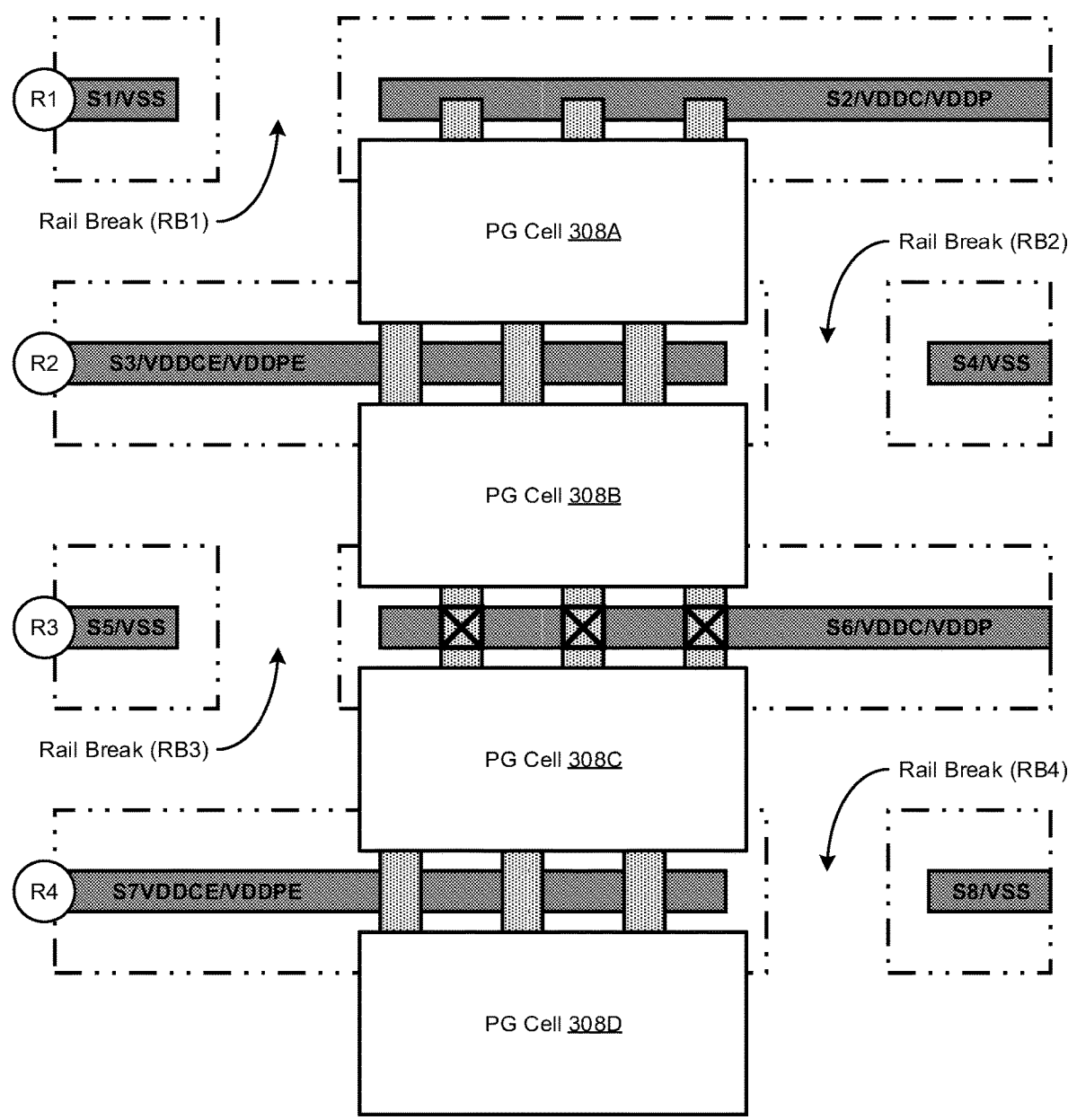
FIG. 3 illustrates a schematic diagram of powergate cell architecture utilizing buried power rails in accordance with implementations described herein.

FIG. 3 illustrates a diagram 300 of powergate cell architecture 304 that utilizes buried power rails (BPR) in accordance with implementations described herein. In some implementations, the powergate cell architecture 304 may be utilized in various wordline header configurations for various memory applications, such as, e.g., SRAM, with respect to usage in novel power-gating cells for wordline driver based power-gating headers.

As shown in FIG. 3, the powergate cell architecture 304 may refer to a power distribution network (PDN) having multiple rows (R1-R4) of buried power rails (BPR, e.g., BS/BM0) that are coupled to various types of logic, such as e.g., one or more powergate cells (PG cells 308A-308D). In some implementations, the multiple rows (R1-R4) of buried power rails (BPR/BS/BM0) may include a first row (R1) and a second row (R2). The first row (R1) may include a first power rail (S1/S2) with multiple segments separated by a first rail break (RB1) disposed on the first side (e.g., left-side) of the logic 308A/308B. Also, the second row (R2) may include a second power rail (S3/S4) with multiple segments separated by a second rail break (RB2) disposed on the second side (e.g., right-side) of the logic 308A/308B that is opposite to the first side (e.g., left-side).

In various implementations, the multiple rows (R1-R4) of the buried power rails (BPR/BS/BM0) may include a third row (R3) and/or a fourth row (R4). The third row (R3) may include a third power rail (S5/S6) with multiple segments separated by a third rail break (RB3) disposed on the first side (e.g., left-side) of the logic 308B/308C. Also, the fourth row (R4) may include a fourth power rail (S7/S8) with multiple segments separated by a fourth rail break (RB4) disposed on the second side (e.g., right-side) of the logic 308C/308D that is opposite to the first side (e.g., left-side).

In some implementations, the multiple segments of the first segmented supply rail (S1/S2) may have a first segment (S1) that is coupled to ground (VSS) and a second segment (S2) that supplies the first voltage domain (VDDC or VDDP). Also, the multiple segments of the second segmented supply rail (S3/S4) may include a third segment (S3) that supplies the second voltage domain (VDDCE or VDDPE) that is different than the first voltage domain (VDDC or VDDP) and a fourth segment (S4) that is coupled to ground (VSS). Also, the multiple segments of the third segmented supply rail (S5/S6) may include a fifth segment (S5) that is coupled to ground (VSS) and a sixth segment (S6) that supplies the first voltage domain (VDDC or VDDP). Moreover, the multiple segments of the fourth segmented supply rail (S7/S8) may have a seventh segment (S7) that supplies the second voltage domain (VDDCE or VDDPE) that is different than the first voltage domain (VDDC or VDDP) and an eighth segment (S8) that is coupled to ground (VSS).

As shown in FIG. 3, the multiple rows (R1-R4) of the buried power rails (BPR) may be disposed with alternating rail breaks (RB1-RB4) so as to define an interchanging directional supply of power to the logic 308A-308D in the various multiple voltage domains (VDDC/VDDCE or VDDP/VDDPE). In various configurations, the alternating rail breaks (RB1-RB4) may characterize an alternating positional orientation of the rail breaks (R1-R4) so as to interchangeably provide multiple directional power supplies to the logic 308A-308D in the multiple voltage domains (VDDC/VDDCE or VDDP/VDDPE). Also, in various configurations, the alternating rail breaks (RB1-RB4) may be disposed to successively alternate positions on either side of the logic 308A-308D from side-to-side. Moreover, successively alternating positional orientation of the rail breaks (RB1-RB4) may allow for transposing the directional supply of power from row-to-row and from side-to-side along a length (e.g., vertical length or height) of the logic 308A-308D.

In some scenarios, the multiple voltage domains refer to the internal periphery voltage domain (VDDP) and the external periphery voltage domain (VDDPE). However, in other scenarios, the multiple voltage domains may also refer to the internal core voltage domain (VDDC) and the external core voltage domain (VDDCE). As such, depending on various specific applications, various alternative configurations may be used to implement multiple different voltage domains provided backside (BS).

The powergate cell architecture 304 may include a power distribution network (PDN) with FS power rails and BS power rails along with transition vias (BTV) that provide for inter-layer transitioning between FS/BS metal layers. The powergate cell architecture 304 may be arranged and configured with one or more powergate cells 308A-308D using the buried power rails (BPR). The powergate cell architecture 304 may be implemented as a system or a device having integrated circuit (IC) components that are arranged and coupled together as an assemblage or combination of parts that provide for physical circuit designs and related structures. Also, in some instances, a method of designing, providing and building the powergate cell architecture 304 as an integrated system or device may involve use of various IC circuit components described herein so as to thereby implement the backside (BS) power distribution schemes and techniques associated therewith. The powergate cell architecture 304 may be integrated with computing circuitry and/or related components on a single chip, and in some scenarios, the powergate cell architecture 304 may also be implemented in some embedded systems for automotive, electronic, mobile, server and Internet-of-things (IoT) applications.

FIG. 4 illustrates a diagram of a method 400 for backside power distribution with buried power rails in accordance with implementations described herein. In various implementations, method 400 may be configured for providing powergate cell architecture with backside (BS) buried power rails (BPR), wherein the rows of segmented supply rails have alternating rail breaks that define an interchanging directional supply of power to the logic in multiple different voltage domains in a manner as described herein.

It should be understood that even though the method 400 indicates a particular order of operation execution, in some cases, various particular portions of the operations may be executed in a different order, and on different systems. In other cases, additional operations and/or steps may be added to and/or omitted from method 400. Also, method 400 may be implemented in hardware and/or software. If implemented in hardware, the method 400 may be implemented with various components and/or circuitry, as described herein in reference to FIGS. 1-3. Also, if implemented in software, the method 400 may be implemented as a program and/or software instruction process configured for backside power distribution schemes and techniques, as described herein. Further, if implemented in software, various instructions related to implementing method 400 may be stored and/or recorded in memory and/or a database. For instance, various types of computing devices having a processor and memory may be configured to perform method 400.

In various implementations, the method 400 may refer to a method of designing, providing, building, fabricating and/or manufacturing backside power rail architecture as an integrated system, device and/or circuit that may involve use of the various IC circuit components described herein so as to implement backside power distribution schemes and techniques associated therewith. In various implementations, the backside power rail architecture may be integrated with computing circuitry and other related components on a single chip, and the backside power distribution circuitry may be implemented in various embedded systems for automotive, electronic, mobile, server and Internet-of-things (IoT) applications, including remote sensor nodes.

At block 410, method 400 may fabricate logic that operates in multiple voltage domains, and at block 420, method 400 may fabricate a backside power network (BSPN) with rows of segmented supply rails coupled to the logic. In various implementations, the multiple voltage domains may refer to an internal core voltage domain (VDDC) and/or an external core voltage domain (VDDCE). Further, in various implementations, the multiple voltage domains may also refer to an internal periphery voltage domain (VDDP) and/or an external periphery voltage domain (VDDPE).

At block 430, method 400 may provide the rows of segmented supply rails with alternating rail breaks that define an interchanging directional supply of power to the logic in the multiple voltage domains. In some implementations, the alternating rail breaks may be disposed so as to successively alternate positions on either side of the logic from side-to-side. Also, in some implementations, successively alternating positional orientation of the rail breaks may allow for transposing the directional supply of power from row-to-row and from side-to-side along a length of the logic.

Advantageously, the various power-gating schemes and techniques described herein may be utilized in various memory applications for reducing leakage in memories, such as, e.g., SRAM, wherein memory logic may be kept coupled to the internal power supplies (VDDP/VDDC). For instance, in some scenarios, the internal power supply may be connected to an external power supply (SOC supply) through a power-gating (PG) cell (e.g., PMOS/PFET device), and these PG cells may be disposed in reference to different locations in the SRAM memory to ensure distribution of critical power supply signals. With the introduction of buried backside metal and buried transition vias, the PG cell designs may be configured with improved efficiency.

As such, the various power-gating schemes and techniques described herein may provide for novel power-gating cell architecture in various memory applications so as to thereby enable efficient backside power by reducing the number of power gaps and by maximizing the power-gating transistor size within the same area. Further, the power-gating schemes and techniques described herein provide for improved modular and flexible designs in a physical layout applications in reference to different power-gating sizes/area without having to design new layout cells.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device having logic that operates in multiple voltage domains. The device may include a backside power network having rows of segmented supply rails coupled to the logic. The rows of segmented supply rails may include alternating rail breaks that define an interchanging directional supply of power to the logic in the multiple voltage domains.

Described herein are various implementations of a power distribution network having multiple rows of buried power rails coupled to logic. The multiple rows of buried power rails may have a first row with a first power and with multiple segments separated by a first rail break disposed on a first side of the logic. The multiple rows of buried power rails may have a second row with a second power rail and multiple segments separated by a second rail break disposed on a second side of the logic opposite to the first side.

Described herein are various implementations of a method. The method may provide or fabricate logic that operates in multiple voltage domains, and the method may provide or fabricate a backside power network with rows of segmented supply rails that are coupled to the logic. The method may further provide the rows of segmented supply rails with alternating rail breaks that define an interchanging directional supply of power to the logic in the multiple voltage domains.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing refers to implementations of various techniques described herein, various other and further implementations may be devised in accordance with the disclosure herein, which may be determined by the claims that follow.

Although the subject matter has been described in language that is specific to various structural features and/or methodological acts, it is to be understood that subject matter defined in the appended claims is not necessarily limited to the specific features or acts described above. Rather, specific features and acts described above are disclosed as example forms of implementing the claims.

What is claimed is:

1. A device, comprising:
   logic that operates in multiple voltage domains; and
   a backside power network having rows of segmented supply rails coupled to the logic,
   wherein the rows of segmented supply rails have alternating rail breaks that define an interchanging directional supply of power to the logic in the multiple voltage domains.

2. The device of claim 1, wherein the logic refers to powergate logic that operates with one or more transistors having a source, a drain and a gate.

3. The device of claim 1, wherein the segmented supply rails refer to buried power rails that are separated and detached into multiple segments with the rail breaks, and wherein the segmented supply rails are formed with buried backside metal.

4. The device of claim 1, wherein the alternating rail breaks characterize an alternating positional orientation of the rail breaks so as to interchangeably provide multiple directional power supplies to the logic in the multiple voltage domains.

5. The device of claim 1, wherein the alternating rail breaks are disposed to successively alternate positions on either side of the logic from side-to-side.

6. The device of claim 5, wherein successively alternating positional orientation of the rail breaks allows for transposing the directional supply of power from row-to-row and from side-to-side along a length of the logic.

7. The device of claim 1, wherein the rows of segmented supply rails include:
- a first row having a first segmented supply rail with multiple segments separated by a first rail break disposed on a first side of the logic,
- a second row having a second segmented supply rail with multiple segments separated by a second rail break disposed on a second side of the logic that is opposite to the first side, and
- a third row having a third segmented supply rail with multiple segments separated by a third rail break disposed on the first side of the logic.

8. The device of claim 1, wherein:
- the multiple segments of the first segmented supply rail include a first segment that supplies a first voltage domain and a second segment that is coupled to ground,
- the multiple segments of the second segmented supply rail include a third segment that is coupled to ground and a fourth segment that supplies a second voltage domain that is different than the first voltage domain, and
- the multiple segments of the third segmented supply rail include a fifth segment that supplies the first voltage domain and a sixth segment that is coupled to ground.

9. The device of claim 1, wherein the multiple voltage domains refer to an internal core voltage domain (VDDC) and an external core voltage domain (VDDCE).

10. The device of claim 1, wherein the multiple voltage domains refer to an internal periphery voltage domain (VDDP) and an external periphery voltage domain (VDDPE).

11. A power distribution network, comprising:
- multiple rows of buried power rails coupled to logic, wherein the multiple rows of buried power rails include:
- a first row having a first power rail with multiple segments separated by a first rail break disposed on a first side of the logic, and
- a second row having a second power rail with multiple segments separated by a second rail break disposed on a second side of the logic opposite to the first side.

12. The network of claim 11, wherein the multiple rows of buried power rails include:
- a third row having a third segmented supply rail with multiple segments separated by a third rail break disposed on the first side of the logic.

13. The network of claim 12, wherein:
- the multiple segments of the first segmented supply rail include a first segment that is coupled to ground and a second segment that supplies a first voltage domain,
- the multiple segments of the second segmented supply rail include a third segment that supplies a second voltage domain that is different than the first voltage domain and a fourth segment that is coupled to ground, and
- the multiple segments of the third segmented supply rail include a fifth segment that is coupled to ground and a sixth segment that supplies the first voltage domain.

14. The network of claim 11, wherein the multiple rows of buried power rails are disposed with alternating rail breaks so as to define an interchanging directional supply of power to the logic in multiple voltage domains.

15. The network of claim 11, wherein the multiple voltage domains refer to an internal core voltage domain (VDDC) and an external core voltage domain (VDDCE).

16. The network of claim 11, wherein the multiple voltage domains refer to an internal periphery voltage domain (VDDP) and an external periphery voltage domain (VDDPE).

17. A method, comprising:
- fabricating logic that operates in multiple voltage domains;
- fabricating a backside power network with rows of segmented supply rails coupled to the logic; and
- providing the rows of segmented supply rails with alternating rail breaks that define an interchanging directional supply of power to the logic in the multiple voltage domains.

18. The method of claim 17, wherein:
- the alternating rail breaks are disposed to successively alternate positions on either side of the logic from side-to-side, and
- successively alternating positional orientation of the rail breaks allows for transposing the directional supply of power from row-to-row and from side-to-side along a length of the logic.

19. The method of claim 17, wherein the multiple voltage domains refer to an internal core voltage domain (VDDC) and an external core voltage domain (VDDCE).

20. The method of claim 17, wherein the multiple voltage domains refer to an internal periphery voltage domain (VDDP) and an external periphery voltage domain (VDDPE).

* * * * *